(12) United States Patent
Christ, Jr. et al.

(10) Patent No.: US 7,377,181 B2
(45) Date of Patent: May 27, 2008

(54) IN-SITU LARGE AREA OPTICAL STRAIN MEASUREMENT USING AN ENCODED DOT PATTERN

(75) Inventors: Robert J. Christ, Jr., Brentwood, NY (US); Jerrell Anthony Nardiello, Hicksville, NY (US); John M. Papazian, Great Neck, NY (US); John Steven Madsen, Commack, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 140 days.

(21) Appl. No.: 11/373,353

(22) Filed: Mar. 10, 2006

(65) Prior Publication Data

US 2007/0209447 A1    Sep. 13, 2007

(51) Int. Cl.
    *G01B 11/16* (2006.01)
(52) U.S. Cl. .................................. 73/800; 356/35.5
(58) Field of Classification Search ................. 73/800; 356/32, 35.5, 330, 373, 394
    See application file for complete search history.

(56) References Cited

U.S. PATENT DOCUMENTS

| 4,031,746 | A | 6/1977 | Furuta et al. |
| 4,112,746 | A | 9/1978 | Itoh et al. |
| 4,436,419 | A | 3/1984 | Stetson et al. |
| 4,722,600 | A | 2/1988 | Chiang |
| 5,170,044 | A | 12/1992 | Pastor |
| 5,175,774 | A | 12/1992 | Truax et al. |
| 5,327,510 | A | 7/1994 | Morikawa et al. |
| 5,473,151 | A | 12/1995 | Priddy et al. |
| 5,477,045 | A | 12/1995 | Priddy et al. |
| 5,479,004 | A | 12/1995 | Priddy et al. |
| 5,568,259 | A | 10/1996 | Kamegawa |
| 5,608,529 | A * | 3/1997 | Hori ........................... 356/609 |
| 5,818,032 | A | 10/1998 | Sun et al. |
| 6,006,608 | A | 12/1999 | Renz et al. |
| 6,460,418 | B1 | 10/2002 | Hiyoshi |
| 6,563,129 | B1 | 5/2003 | Knobel |
| 6,869,022 | B2 | 3/2005 | Corby, Jr. |
| 7,154,613 | B2 * | 12/2006 | Christ et al. .................. 356/601 |
| 2005/0087604 | A1 | 4/2005 | Nguyen et al. |
| 2005/0200857 | A1 | 9/2005 | Christ, Jr. et al. |
| 2006/0007452 | A1 * | 1/2006 | Gaspard et al. ............. 356/620 |
| 2006/0289652 | A1 * | 12/2006 | Hovis et al. ........... 235/462.09 |

* cited by examiner

*Primary Examiner*—Edward Lefkowitz
*Assistant Examiner*—Freddie Kirkland, III
(74) *Attorney, Agent, or Firm*—Robert P. Lenart, Esq.; Pietragallo Gordon Alfano Bosick & Raspanti, LLP

(57) ABSTRACT

A method of measuring strain in a test specimen comprises the steps of placing a pattern of marks on a surface of the test specimen, wherein the pattern of marks includes a plurality of target marks and a plurality of sets of coded marks, using the sets of coded marks to identify locations of at least two of the target marks, and using a change in distance between at least two of the marks to determine strain in the test specimen. An apparatus that performs the method is also provided.

14 Claims, 3 Drawing Sheets

IN-SITU LARGE AREA OPTICAL STRAIN MEASUREMENT USING AN ENCODED DOT PATTERN

FIELD OF THE INVENTION

This invention relates to methods and apparatus for measuring strain in a test specimen, and more particularly to methods and apparatus for measuring strain over a large area of the test specimen.

BACKGROUND OF THE INVENTION

During structural testing, it is often of interest to measure the imposed mechanical strains for either documentary purposes or for control of the test. The most common systems used for strain measurement are extensometers or strain gages, which are devices that are mounted in contact with the test specimen.

In some cases it is desirable to have a non-contact strain measurement system. Such systems are commercially available and typically require registration marks to be placed or projected onto the specimen. The limitation of these systems is that they can only provide strain measurement in a small area, or the strain is averaged over a large area and does not provide information about two-dimensional strain variations throughout the test specimen.

There are many commercially available electro-optical tensile testing strain measurement devices. However, they are not useful in large area measurements.

There is a need for a non-contact strain measurement system that overcomes the limitation of prior systems.

SUMMARY OF THE INVENTION

The invention provides a method of measuring strain in a test specimen comprising the steps of placing a pattern of marks on a surface of the test specimen, wherein the pattern of marks includes a plurality of target marks and a plurality of sets of coded marks, using the sets of coded marks to identify locations of at least two of the target marks, and using a change in distance between at least two of the marks to determine strain in the test specimen.

In another aspect, the invention provides an apparatus comprising a pattern of marks on a surface of the test specimen, wherein the pattern of marks includes a plurality of target marks and a plurality of sets of coded marks representative of locations of the target marks, a sensor for detecting the pattern of marks, and a processor for using the coded marks to determine locations of at least two of the target marks, for measuring changes in distance between at least two of the marks, and for calculating strain in the test specimen based on the changes in distance.

DETAILED DESCRIPTION OF THE INVENTION

Figure 1:
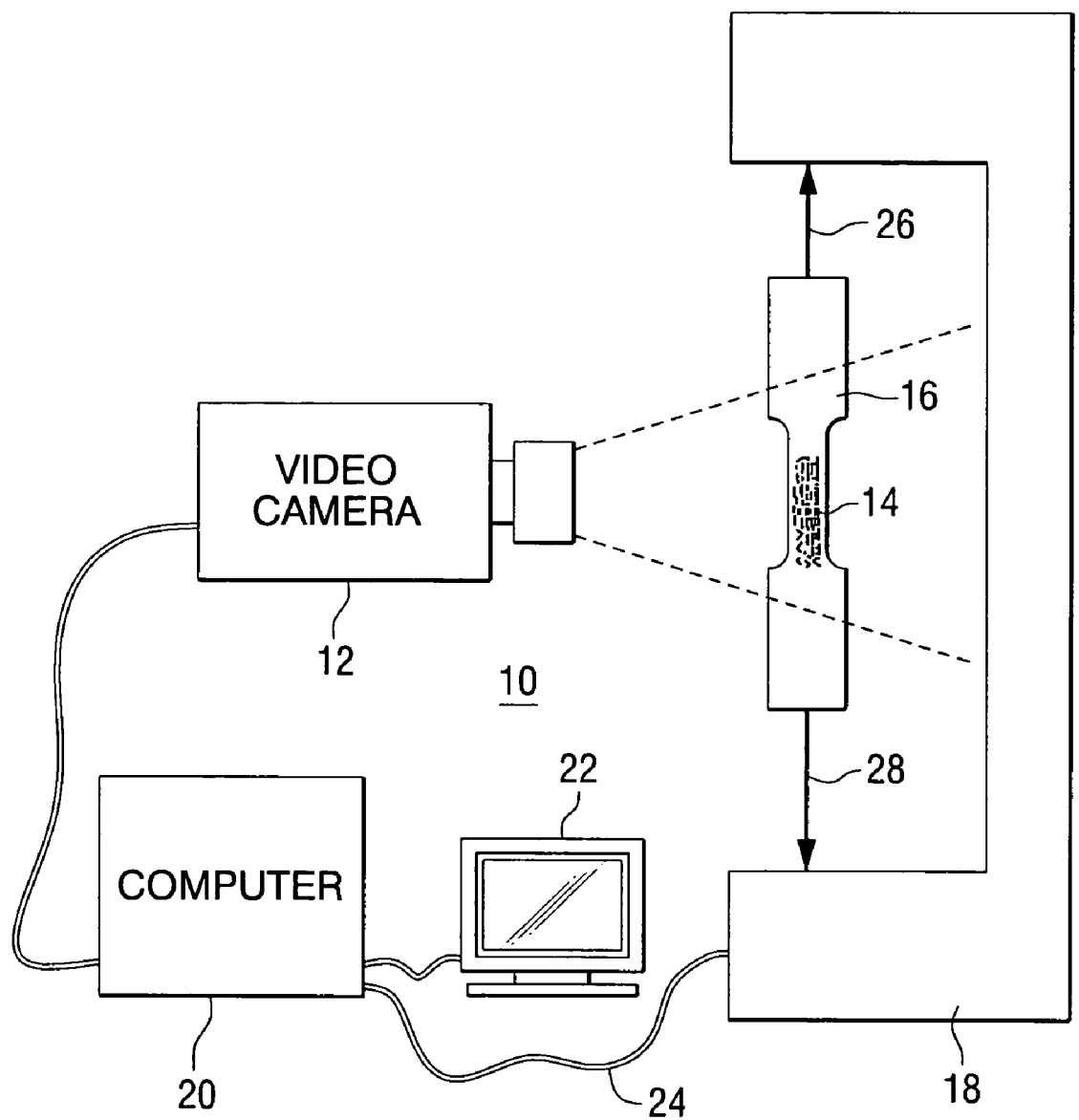
FIG. 1 is a schematic representation of a strain measurement system constructed in accordance with the invention.

This invention provides a method and apparatus for non-contact strain measurement of a work piece or test specimen. FIG. 1 is a schematic representation of a strain measurement system 10 constructed in accordance with the invention. The system includes an imaging device, such as a video camera 12 positioned to capture images of a pattern 14 of marks on a surface of a work piece or test specimen 16. In this example, the test specimen is mechanically connected to a load application device 18 that is used to place a mechanical load on the test specimen, resulting in deformation of the test specimen and changes in the images captured by the video camera. Image information is sent from the video camera to an acquisition and control computer 20, which processes the information and produces an output that is representative of the mechanical strain in the test specimen. The output is displayed on a user interface 22. A feedback loop 24 is also provided to permit control of the load application device in response to measured strain. In this example, the load application device 18 applies a tensile stress to the test specimen in the direction indicated by arrows 26 and 28. The load application device can be a commercially available stress tester.

In the system of FIG. 1, a surface of the test specimen is imprinted with the encoded pattern 14 of marks. The mark pattern can be applied using, for example, a laser or ink-jet printer, or laser etching. Image information from the video camera is processed on a computer running mark location software. The relative distance between the marks, and changes in the distance, are used to determine mechanical strain in the test specimen. The pattern includes a plurality of target marks and a plurality of encoded marks. Each target mark is associated with a set of encoded marks. The encoded marks of each set are configured to represent a code that identifies the location of the associated target mark. The marks can be circular dots, but are not limited to any particular shape.

In one embodiment, a two-dimensional array of circular dots is imprinted on the test specimen to be viewed by a video camera during the test. The array of dots includes a plurality of target dots and a plurality of coded dots. Each of the target dots is associated with a set of the coded dots that contain information about the location of the associated target dot. The acquisition and control computer uses the sets of coded dots to identify the location of at least two of the target dots. Once the locations of two of the target dots are known, the locations of all the dots are also known. Then a change in the distance between any two dots can be used to calculate the strain in the test specimen.

The encoded dots can be configured to represent a binary number (also referred to as a binary encryption marker), which allows the system to quickly identify a specific location within the array. The marks in the array can be black and white or color. Bits in the binary number can be represented by differences in the shape, size, or reflectivity of the black and white marks, or by differences in color of the colored marks.

Figure 2:
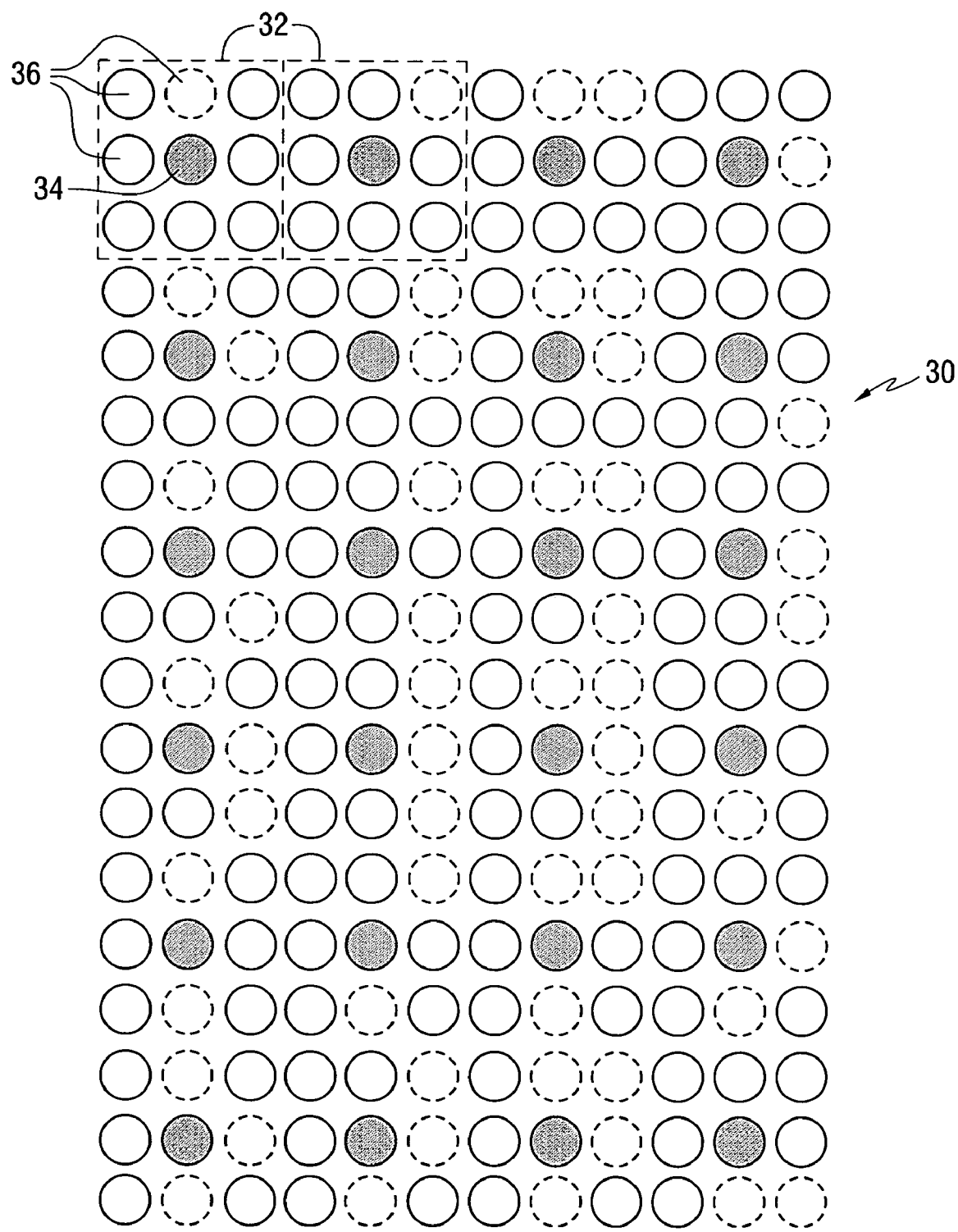
FIG. 2 is a schematic representation of a two-color binary encoded dot pattern.

FIG. 2 is a schematic representation of a two-color binary encoded two-dimensional dot pattern 30. The dot pattern includes a plurality of blocks 32, each containing a target dot 34 and a set of encoded dots 36. The encoded dots are the dots immediately adjacent to each target dot. In FIG. 2, the target dots are shaded circles, the open solid circles represent dots of a first color, and the open dotted circles represent dots of a second color. The first and second colors can be, for example, blue and red. However, any color could be used.

Figure 3:
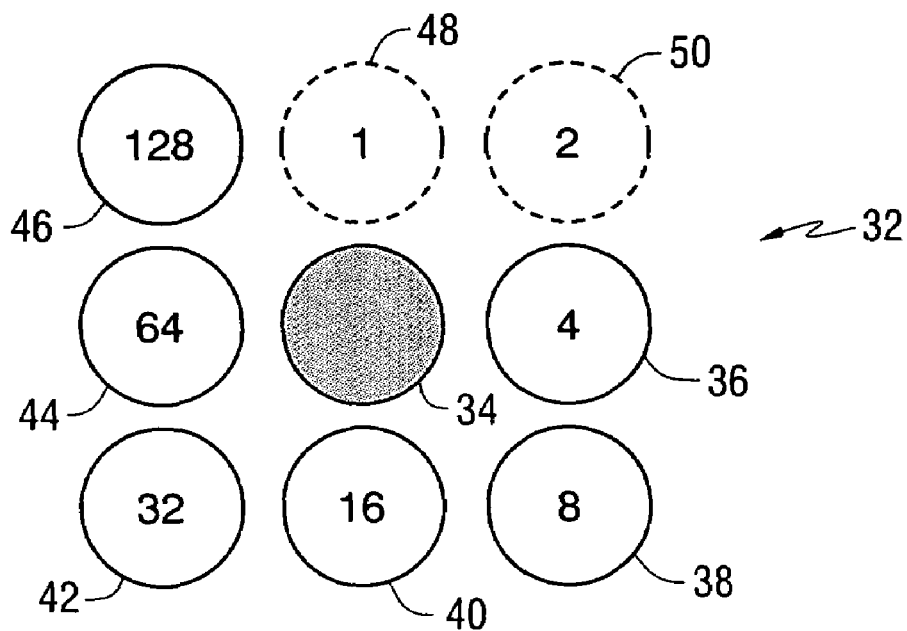
FIG. 3 is a portion of the dot pattern of FIG. 2.

FIG. 3 is an enlarged view of one block 32 of dots of the pattern of FIG. 2. In the dot pattern of FIG. 3, shaded circle 34 is a target dot, open circles 36, 38, 40, 42, 44 and 46 represent encoded dots of a first color, and dotted circles 48 and 50 represent encoded dots of a second color. The number inside the circles represents the value of the circles when encoded as a binary number. The first color can represent a logic "0" and the second color can represent a logic "1". Thus the encoded dots of FIG. 3 represent the number 3 (1+2). The computer can then recognize that the target dot in this block is located at position 3.

In the example of FIG. 3, each block in the dot pattern includes nine dots. One dot in each block is a target dot and the other eight are encoded dots. Each block has a unique code that represents the location of the target dot in that block. For example, by using two colors for the encoded dots to produce a binary code, there are 256 possible combinations. Local strain in the test specimen is calculated when the system locates the center of a dot and compares a change in the relative position of that center to the center of one or more other dots.

The steps necessary to make the strain determination are as follows. Given an initial dot spacing, a baseline image is taken of all, or part, of the printed array. The software screens the image to locate a target dot. Once it identifies a target dot, it examines its nearest neighbors, thus determining a unique identity for the target. Subsequently, the next nearest target dot is found, then its nearest neighbors, and thus the identity of the second target dot. At this point the rotational orientation of the array is checked. For example, if the first target was identified as a 4, we know that the neighbor to the right should be a 5. If the encoding indicates otherwise, we can determine that the array is ordered 90 degrees counterclockwise. Afterwards, the process continues looking at neighboring target dots until the entire image, and thus the entire array of dots, has been identified. The software will establish a file of reference locations for the dots based on their binary identification (ID), and then compare any two dot locations in later frames to the reference values to determine strains.

Figure 4:
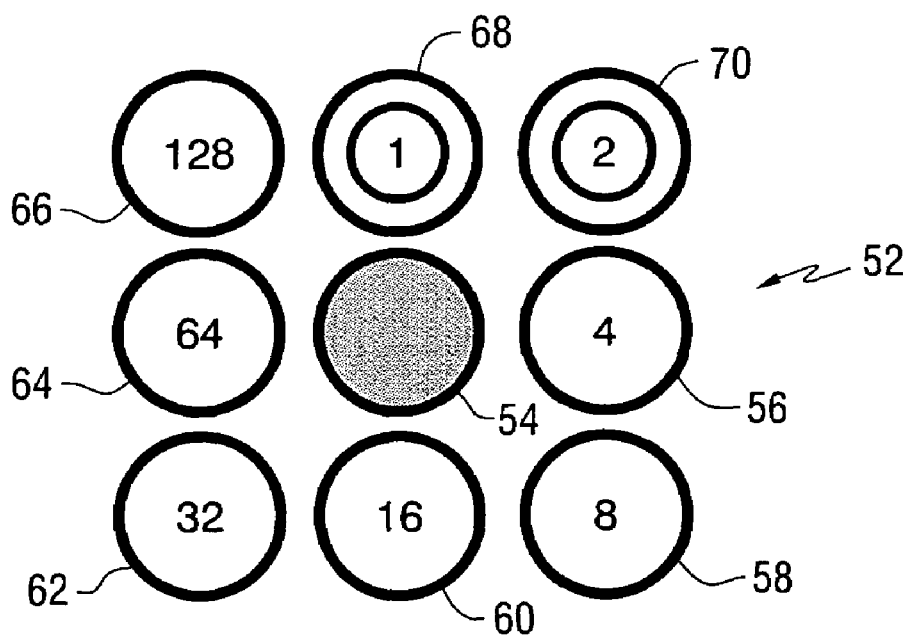
FIG. 4 is an example of a monochromatic binary encoded dot pattern.

The number of possible codes can be increased by using additional colors and/or by increasing the number of coded dots for each target dot. Alternatively, the pattern can include monochromatic coded marks, using a shape, size (that is, a larger or smaller size for the target dots), or shade variation for encoding rather than a color variation. FIG. 4 is an example of a block 52 having a monochromatic binary encoded dot pattern.

In the dot pattern of FIG. 4, shaded circle 54 is a target dot, open circles 56, 58, 60, 62, 64 and 66 represent dots encoded for a first binary value, and double circles 68 and 70 represent dots encoded for a second binary value. The number inside the circles represents the value of the circles when encoded as a binary number. In this example, the first binary value is a logic "0" and the second binary value is a logic "1". Thus the encoded dots of FIG. 4 represent the number 3 (1+2). The computer can then recognize that the target dot in this block is located at position 3.

The primary application for this system provides accurate strain measurement over an area on a test specimen while a fatigue or static test is ongoing. The strain measurement output of this system can be used for either data acquisition or as feedback for experimental control.

In another aspect, the invention provides a method for large area strain measurement such as may be encountered in biaxial testing, full-scale component testing (for example, a structural test of an aircraft wing), etc. The method includes the steps of: placing an array of marks on a surface of a test specimen, wherein the marks include a plurality of target marks and a plurality of sets of encoded marks that identify locations of the target marks; and using changes in the distance between any two marks to determine strain in the test specimen.

Two-dimensional strain measurements can be made at potentially thousands of different points across a specimen. In order to maintain registration of such a large number of measurement points, a binary encoded dot pattern is used to allow unique identification of each point. Once the location of a point is identified, its relative distance to neighboring points is utilized to calculate local strains.

The concept can also be extended to include the case where the dot pattern is on a non-planar surface. The primary difference in such a system is the need to have a baseline measurement of the third dimension. This could be accomplished by taking initial measurements with a Coordinate Measuring Machine (CMM), or other device, and storing them in a lookup table for use in future state calculations. Alternately, a multiple camera system could be employed to image the dot pattern and triangulate the dot positions in three dimensions.

While the invention has been described in terms of several embodiments, it will be apparent to those skilled in the art that various changes can be made to the described embodiments without departing from the scope of the invention as set forth in the following claims.

What is claimed is:

1. A method of measuring strain in a test specimen, the method comprising the steps of:
   placing a pattern of marks on a surface of the test specimen, wherein the pattern of marks includes a plurality of target marks and a plurality of sets of coded marks, each set of coded marks defining a code that identifies a location of one of the target marks;
   using the sets of coded marks to identify locations of at least two of the target marks; and
   using a change in distance between at least two of the marks to determine strain in the test specimen.

2. The method of claim 1, wherein the coded marks are coded with a binary code representative of the location of the target marks.

3. The method of claim 1, wherein the coded marks are coded by color, size, shape or shade.

4. The method of claim 1, wherein the pattern of marks forms a two-dimensional array of marks.

5. The method of claim 1, wherein the pattern of marks forms a three-dimensional array of marks.

6. The method of claim 1, further comprising the steps of:
   capturing a base image of the pattern of marks; and
   identifying locations of at least two of the target marks in the base image.

7. The method of claim 1, wherein the size of the target marks differs from the size of the coded marks.

8. An apparatus comprising:
   a pattern of marks on a surface of the test specimen, wherein the pattern of marks includes a plurality of target marks and a plurality of sets of coded marks, each set of coded marks defining a code that identifies a location of one of the target marks;
   a sensor for detecting the pattern of marks; and
   a processor for using the coded marks to determine locations of at least two of the target marks, for measuring changes in distance between at least two of the marks, and for calculating strain in the test specimen based on the changes in distance.

9. The apparatus of claim 8, wherein the coded marks are coded with a binary code representative of the location of the target marks.

10. The apparatus of claim 8, wherein the coded marks are coded by color, size, shape or shade.

11. The apparatus of claim 8, wherein the pattern of marks forms a two-dimensional array of marks.

12. The apparatus of claim 8, wherein the pattern of marks forms a three-dimensional array of marks.

13. The apparatus of claim 8, further comprising:
a video camera for capturing images of the pattern of marks.

14. The apparatus of claim 8, wherein the size of the target marks differs from the size of the coded marks.

* * * * *